(12) United States Patent
Viebahn

(10) Patent No.: US 6,948,523 B2
(45) Date of Patent: Sep. 27, 2005

(54) FUEL TANK

(75) Inventor: Reiner Viebahn, Wachtberg (DE)

(73) Assignee: Kautex Textron GmbH & Co. KG, Bonn (DE)

( * ) Notice: Subject to any disclaimer, the term of this patent is extended or adjusted under 35 U.S.C. 154(b) by 196 days.

(21) Appl. No.: 10/128,075

(22) Filed: Apr. 23, 2002

(65) Prior Publication Data

US 2002/0157715 A1 Oct. 31, 2002

(30) Foreign Application Priority Data

Apr. 26, 2001 (DE) .......................................... 101 20 542

(51) Int. Cl.[7] .............................................. F16K 24/00
(52) U.S. Cl. .................. 137/588; 137/565.17; 137/587; 137/592; 141/59; 123/516
(58) Field of Search ................. 137/587, 588, 137/592, 565.17, 520; 141/59; 123/516, 519

(56) References Cited

U.S. PATENT DOCUMENTS

| | | | |
|---|---|---|---|
| 4,722,454 A | 2/1988 | Fischer | 220/85 R |
| 5,205,330 A | * 4/1993 | Sekine | 141/59 |
| 5,282,497 A | * 2/1994 | Allison | 141/59 |
| 5,640,993 A | * 6/1997 | Kasugai et al. | 137/587 |
| 5,819,796 A | * 10/1998 | Kunimitsu et al. | 137/587 |

FOREIGN PATENT DOCUMENTS

| | | | |
|---|---|---|---|
| DE | 30 40 160 A1 | 3/1982 | B60K/15/02 |
| DE | 30 17 765 C2 | 6/1982 | B60K/15/04 |
| DE | 197 16 812 A1 | 10/1998 | B60K/15/03 |
| DE | 200 19 968 U1 | 3/2001 | B60K/15/035 |
| EP | 0 223 931 A1 | 8/1986 | B60K/15/04 |
| EP | 0 873 900 B1 | 12/2001 | B60K/15/04 |
| GB | 2 076 758 A | 5/1981 | B60K/15/04 |
| JP | 62131819 A | 6/1987 | B60K/15/02 |

* cited by examiner

Primary Examiner—A. Michael Chambers
(74) Attorney, Agent, or Firm—Grossman Tucker Perreault & Pfleger, PLLC

(57) ABSTRACT

A fuel tank for a motor vehicle has means for introducing air into and venting air from the tank, and a filler pipe for filling the tank with fuel. A recirculation conduit communicates with the filler pipe. The recirculation conduit is connected to the filler pipe within the volume enclosed by the tank, approximately in the region of the outlet end of the filler pipe.

12 Claims, 2 Drawing Sheets

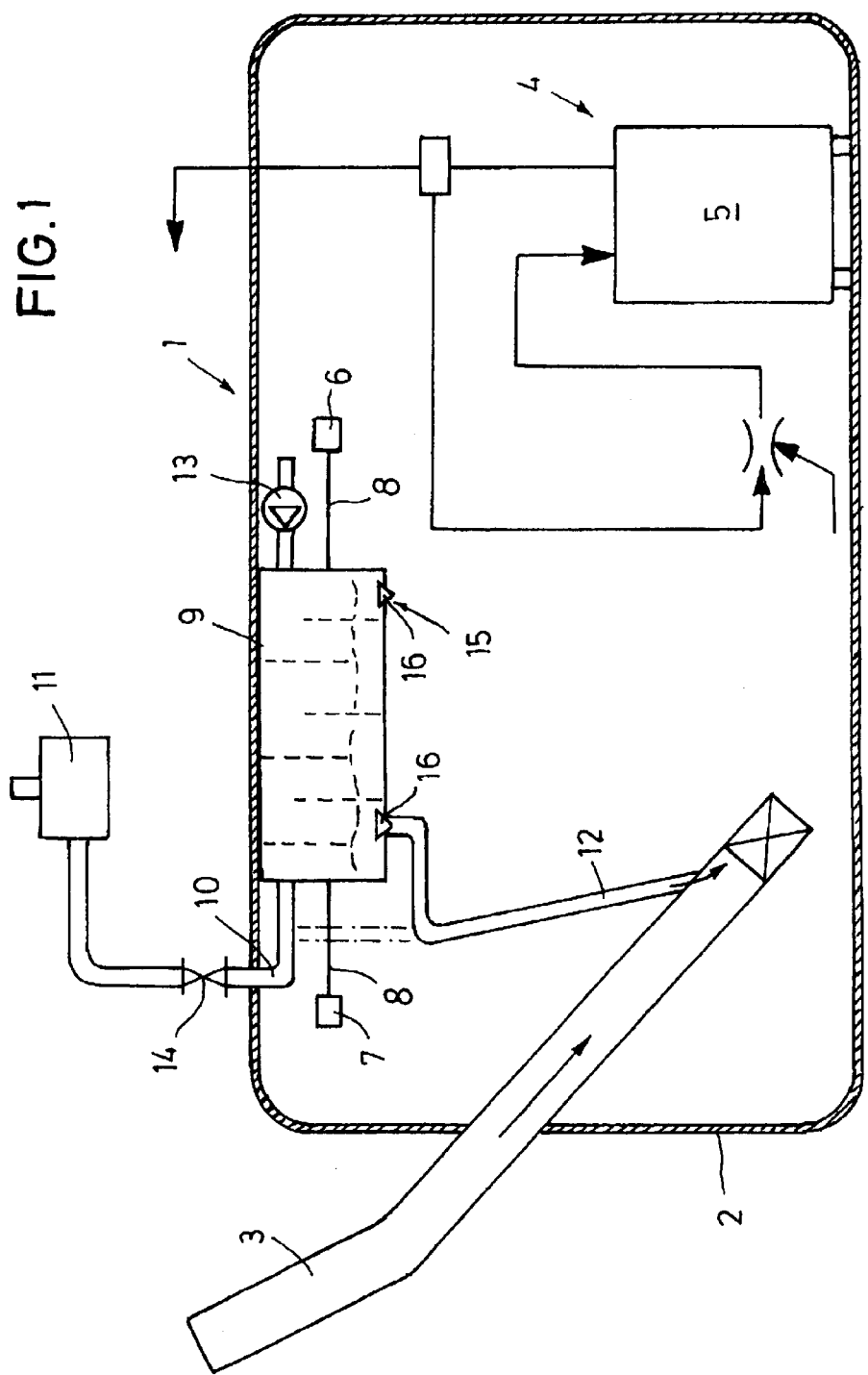

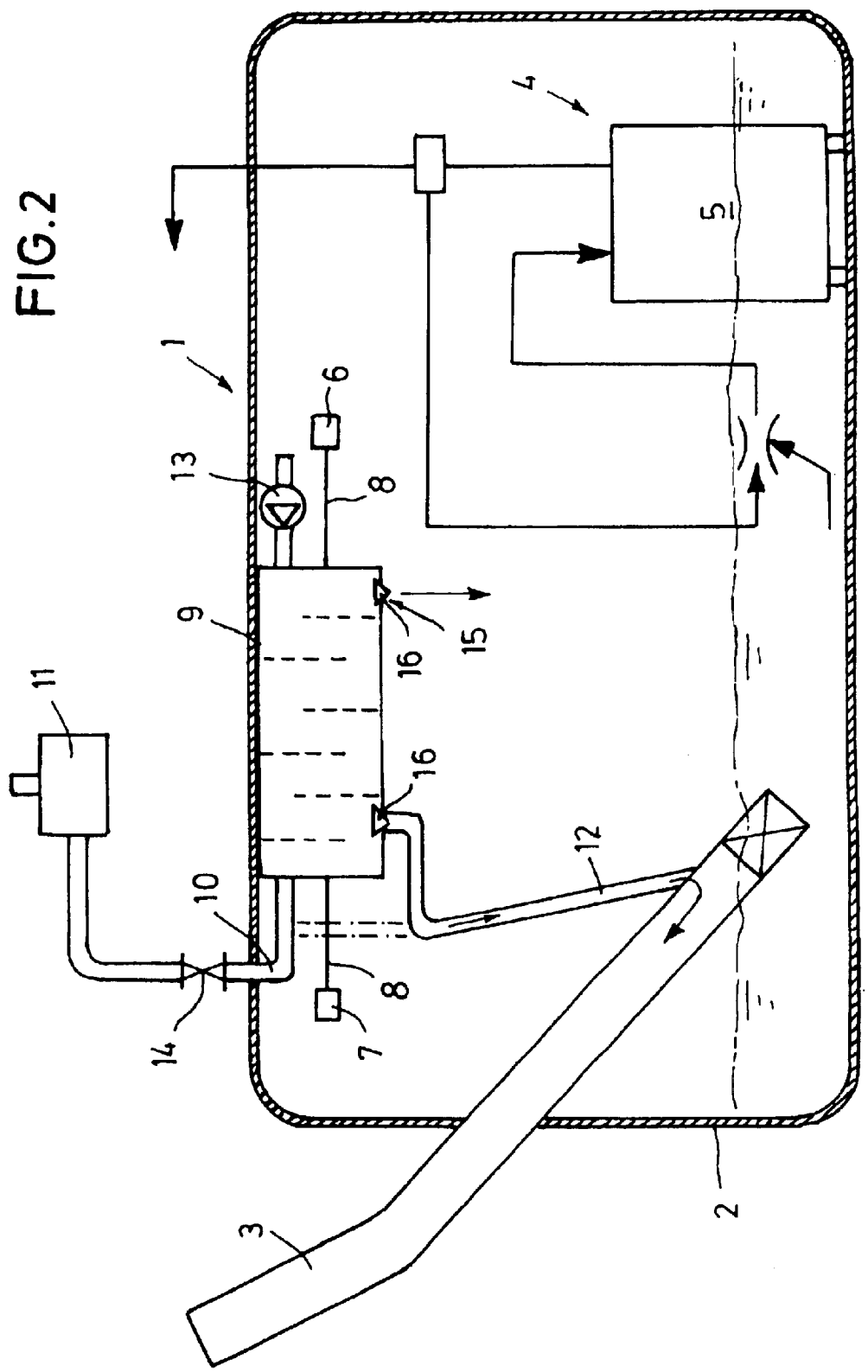

FUEL TANK

FIELD OF THE INVENTION

The invention concerns generally a fuel tank and more particularly a fuel tank for a motor vehicle.

BACKGROUND OF THE INVENTION

In relation to fuel tanks for a motor vehicle, it is a conventional measure for a tank venting device to be connected to activated carbon filter as a fuel vapor filter, thereby to ensure that, in a tank refilling procedure, any gases and vapors which escape from the internal volume of the fuel tank are prevented from reaching the ambient atmosphere without first being cleaned of fuel vapors. It will also be appreciated that gases which are given off due to the effect of heat on the tank or due to sloshing and splashing movements of the fuel in the tank are also discharged by a tank venting system. Usually the activated carbon filter which serves as a fuel vapor filter is regenerated by means of combustion air which is drawn in by the engine of the motor vehicle to which the tank is fitted. An activated carbon filter of that nature is usually only of a limited capacity as, for reasons of cost and available space, it is generally desirable for the activated carbon filter to be kept as small as possible. That is only possible if it is subjected to a minimum effect in terms of hydrocarbon-charged gases acting thereon, in other words, if the volume of gas flowing through the activated carbon filter is kept comparatively small.

It will be appreciated further that the flow of gases through the activated carbon filter is at its greatest in a tank refuelling procedure. In such a situation, the fuel tank is frequently required to receive a volume of fuel of between 30 and 60 liters per minute. A corresponding flow by volume of gas or air has to be discharged at the same time. In order in that situation to minimise the loading on the activated carbon, it is possible to connect a recirculation conduit to the filler pipe of the tank, the recirculation conduit providing for recirculation of the gas going to the activated carbon filter through the filler pipe of the tank in such a refuelling operation.

It will be seen therefore that this operational system provides that ambient air which is entrained in the tank refuelling operation by the jet of fuel as it is in the process of issuing from the refuelling gun, before it can pass into the atmosphere again by way of the activated carbon filter, is branched away from the activated carbon filter by way of the recirculation conduit and is passed back through the filler pipe again. In that way the fuel vapor filter in the form of the activated carbon filter is kept free from a part of the gases which are displaced by the fuel passing into the tank.

The amount of gases which is recirculated in that fashion is subject to limits, more specifically primarily by virtue of the diameter of the recirculation conduit. The recirculation conduit normally opens approximately in the region of the discharge opening of the fuel filler gun, in the filler pipe of the tank. The aim at any event in a tank refuelling procedure is to ensure that hydrocarbon-bearing vapors or gases do not escape to the atmosphere from the tank by way of the filler pipe. For that reason, a design of filler pipe provides that it is elastically deformable at least over portions of its periphery and is so designed that it represents a constriction in the filler pipe when in the non-expanded condition thereof. When the motor vehicle tank is being refuelled, the cross-section of the filler pipe is expanded by the jet of fuel impinging thereon so that the gases in the fuel tank are reliably prevented from escaping through the filler pipe during the refuelling procedure. An arrangement of that kind can be found for example in DE 197 16 812 A1 and is referred to as a liquid seal. As an alternative thereto, sleeve-like extension portions can be provided at the discharge end of the filler pipe, which extend as far as the bottom of the fuel tank and are held in a closed condition by the hydrostatic pressure of the head of fuel in the tank.

If the diameter selected for the recirculation conduit is too large, there is the risk that only a part of the gases issuing from the recirculation conduit in the filler pipe is actually also entrained into the filler pipe whereas the remaining part of the gases passes into the ambient atmosphere by way of the filler pipe. That constitutes a reduction in the effectiveness of the liquid seal.

SUMMARY OF THE INVENTION

An object of the present invention is to provide a fuel tank arrangement capable of reducing the flow through a fuel vapor filter using means which are as simple as possible.

Another object of the present invention is to provide a fuel tank, for example for a motor vehicle, so designed as to substantially prevent the issue of fuel vapors or hydrocarbon-bearing gases to the ambient atmosphere by way of the filler pipe of the tank in a tank refuelling operation.

Still another object of the present invention is to provide a motor vehicle fuel tank having an improved fuel vapor recirculation system.

In accordance with the principles of the present invention the foregoing and other objects are attained by a fuel tank, for example by a motor vehicle, comprising means for venting the interior of the tank, and at least one filler pipe having an outlet end within the tank. The tank further includes at least one recirculation conduit communicating with the filler pipe in such a way that hydrocarbon-charged vapors or gases from the volume of the tank can be circulated through the filler pipe for example when filling the tank. The recirculation conduit is connected to the filler pipe within the volume enclosed by the tank at least substantially in the region of the outlet end of the filler pipe.

In accordance with a preferred feature of the invention the recirculation conduit, at its end remote from the filler pipe, is connected to a vent conduit connected upstream of the fuel vapor filter.

The invention here makes use of a kind of venturi effect in the outlet region of the filler pipe so that a recirculation conduit which is disposed in the fuel tank, of comparatively large diameter, can particularly effectively recirculate a large part of the gases taken off upstream of the fuel vapor filter, through the filler pipe.

Another particularly preferred feature of the invention provides that the recirculation conduit is connected to a bead removal container. Such a bead removal container is usually disposed upstream of the fuel vapor filter in order to ensure that finely dispersed liquid hydrocarbon does not pass into the fuel vapor filter.

In a particularly preferred aspect of that feature the recirculation conduit can be in the form of a discharge conduit from the bead removal container.

In that case, the recirculation conduit can be connected between the filler pipe and the bead removal container in such a way that, when the fuel tank is being refilled, active emptying of the bead removal container can take place against a drop in level or when there is a slight difference in level between the level of fuel in the fuel tank and the bead removal container.

Active emptying of the bead removal container by way of the recirculation conduit is particularly appropriate when in accordance with a preferred feature of the invention the bead removal container is disposed within the fuel tank. In that case, a major difference in level between the filling level in the bead removal container and the filling level in the fuel tank will scarcely occur. Such an arrangement of the bead removal container is preferred as in that way it is possible to reduce the number of required connecting points on the fuel tank wall, to a minimum. That also entails a particularly advantageous reduction in the possible sources of emission of hydrocarbons from the fuel tank.

In accordance with another preferred feature of the invention the tank includes means for pressurising the recirculation conduit for diagnostic purposes. That renders redundant an on-board diagnostics line, often referred to as an OBD line, which is otherwise disposed outside the tank. When the tank refuelling operation is concluded the recirculation conduit can perform that function.

In that respect, it is desirable to provide a shut-off valve in the vent conduit.

Preferably, the bead removal container can be connected to the pressure side of a pump provided for checking sealing integrity. The bead removal container may have at least one outlet which opens into the fuel tank and which is closable by a suitable check valve.

Further objects, features and advantages of the invention will be apparent from the description hereinafter of a preferred embodiment thereof.

BRIEF DESCRIPTION OF THE DRAWING

FIG. 1 is a diagrammatic view of a fuel tank according to the invention during a tank refuelling procedure, and FIG. 2 is a diagrammatic view of the fuel tank shown in FIG. 1 during the sealing integrity checking operation (OBD-function).

DESCRIPTION OF THE PREFERRED EMBODIMENT

Referring firstly to FIG. 1, reference numeral 1 therein denotes a fuel tank, for example for a motor vehicle, which is in the form of an extrusion blow-molded fuel tank. Reference numeral 2 in FIG. 1 denotes the wall of the tank 1, which is very substantially non-transmissive in relation to fluid hydrocarbons to prevent the permeation thereof. It will be appreciated that the structure and mode of manufacture of the fuel tank 1 is not relevant to the present invention as the fuel tank 1 can equally be made from sheet metal or in a multi-part structure from plastic material, for example it can comprise injection-molded casing portions which are assembled together.

The fuel tank 1 includes a filler pipe 3 and a fuel delivery unit 4 disposed in the internal volume of the fuel tank 1. The fuel delivery unit 4 comprises a swirl or surge pot 5 as a reservoir for a fuel delivery pump (not shown) which is arranged therein, to ensure that the pump has a steady supply of fuel. For venting of the fuel tank 1 in a refuelling procedure and also in operation of the motor vehicle to which the fuel tank 1 is fitted, the fuel tank 1 has vent valves indicated at 6 and 7 of which the vent valve indicated at 6 is in the form of a refuelling vent valve to provide for venting of the tank during a refuelling procedure whereas the vent valve indicated at 7 serves as an operational vent valve for continuously venting of the fuel tank during operation of the motor vehicle engine which is supplied with fuel from the tank 1. The vent valves 6, 7 are each in the form of a float-type gravity-operated valve which each close off the respective vent lines indicated at 8 when the level of fuel in the fuel tank 1 exceeds a predetermined level or in a roll-over situation, that is to say when the motor vehicle in which the tank 1 is fitted turns over. The vent valves 6, 7 are connected by way of the vent lines 8 to a bead removal container 9 from which a main vent conduit 10 goes to a fuel vapor filter 11 in the form of an activated carbon filter.

The bead removal container 9 which, in the illustrated embodiment, is disposed in the fuel tank 1, makes it possible for liquid hydrocarbons which are dispersed in the fuel vapor to condense out. For that purpose, the bead removal container 9 is divided up in an internal labyrinth-like structure, as is indicated in the Figures. The structure and the mode of operation of a typical bead removal container are generally known and will therefore not be described in greater detail herein.

Reference numeral 12 indicates a recirculation conduit which has an end connected to the filler pipe 3 at least adjacent to the outlet end of the filler pipe 3, which is therefore the lower end in FIG. 1. The recirculation conduit 12 primarily permits recirculation of the gases and vapors in the fuel tank 1, when the fuel tank 1 is being refuelled. In the tank refuelling procedure, the fuel which is introduced into the fuel tank causes displacement of a corresponding volume of gas which is at least partially discharged to the atmosphere by way of the vent valve 6, the bead removal container 9, the main vent line 10 and the fuel vapor filter 11. The suction effect generated by the jet of fuel flowing in the filler pipe 3 causes a part of that gas to be sucked in from the bead removal container 9 and circulated through the filler pipe 3 so that the sucked-in volume of ambient air through the filler pipe 3 is reduced by the corresponding quantity of gas from the bead removal container 9. The loading on the fuel vapor filter is correspondingly reduced as a result. Positioning the recirculation conduit so that it is within the fuel tank 1 means that it can be of comparatively large diameter so that the amount of gases passed to the fuel vapor filter 11 can be correspondingly small.

FIG. 1 shows a tank refuelling procedure by way of indication. As is also only indicated by the broken lines in FIG. 1, the recirculation conduit 12 can also be connected directly to the main vent line 10 within the fuel tank 1.

The illustrated embodiment of the fuel tank according to the invention however also provides that at the same time the recirculation conduit 12 performs the function of the discharge conduit for the bead removal container 9. Furthermore, the recirculation conduit 12 serves as a diagnostic conduit for sealing integrity checking of the fuel tank 1 and the filler pipe 3, as will be discussed in greater detail hereinafter.

Reference will now be made to FIG. 2 to consider the situation where condensate collects in the bead removal container 9 during operation of the motor vehicle to which the tank 1 is fitted. By virtue of the difference in level, which is slight when the fuel tank 1 is filled with fuel, between the level of liquid in the bead removal container 9 and the level of fuel in the main volume of the fuel tank, drainage of the fuel in the bead removal container 9 from same becomes more problematical. In this embodiment the suction effect generated in the recirculation conduit 12 by the jet of fuel issuing from the tank refuelling gun in the tank refuelling procedure is utilised for actively emptying the bead removal container 9.

Looking therefore at FIG. 2, reference numeral 16 denotes a check valve provided in the region of the connection of the recirculation conduit 12, at its end remote from the filler pipe 3, to the bead removal 9, so that any entry of fuel from the recirculation conduit 12 into the bead removal container 9 is reliably prevented.

The selected arrangement according to the invention of the recirculation conduit 12 makes it possible to use it also for on-board diagnostics purposes, referred to as OBD. For the purposes of checking and also displaying sealing integrity of the tank system overall, for that purpose the fuel tank 1 is exposed to a pressure drop, for example in the embodiment illustrated herein the fuel tank 1 is subjected to an increased pressure therewithin. In the event of premature decay of the pressure drop, a signal is produced which indicates that the system lacks sealing integrity. As the filler pipe 3 is generally closed at its end, for example by means of a check flap, a spout valve or the like, in which respect it may be noted that the drawing diagrammatically indicates a blow-back valve disposed at the lower outlet end of the filler pipe 3, the volume of the filler pipe 3 represents a volume which is separate from the main internal volume of the fuel tank 1 and which has to be connected by means of a corresponding diagnostic conduit. Using the recirculation conduit 12 for that purpose means that there is then no need to have a separate OBD-conduit of that kind.

As illustrated in both of the Figures, provided in the interior of the fuel tank 1 for the sealing integrity checking procedure is a pump 13 which forms part of the OBD system and which is connected on its outlet or pressure side to the bead removal container 9. Disposed in the main vent conduit 10 downstream of the fuel vapor filter 11 in the flow direction is a shut-off valve 14 with which the main vent conduit 10 can be closed off in the sealing integrity checking procedure. Finally, the bead removal container 9 also has a second outlet 15 which is also provided with a check valve 16. The bead removal container 9 can be emptied by way of that second outlet 15 when the recirculation conduit 12 is connected directly to the main vent conduit 10, as indicated in the dash-dotted lines in the drawings. Active emptying of a bead removal container is referred to for example in German utility model No 200 19 968 to which reference is hereby made for incorporation of the full content thereof.

The check valves 16 in the bead removal container 9 are in this case each in the form of mushroom-type valves, in other words, a plug-like valve body of rubber closes almost in a pressure-less condition through openings in the bead removal container 9 so that the check valves 16 close when there is a pressure drop from the volume of the fuel tank 1 to the bead removal container 9 but open in the reverse situation.

It will be appreciated from the foregoing description that the present invention can provide major advantages in regard to a fuel tank, in that on the one hand the diameter of the recirculation conduit can be selected to be substantially greater so that a higher recirculation rate now becomes a possibility. On the other hand, by virtue of the above-discussed arrangement of the recirculation conduit the latter can be arranged completely in the fuel tank, so that at the same time this eliminates a possible source of hydrocarbon permeation from the tank. It is appreciated in that respect that lines and connections which are outside a fuel tank can easily constitute sources of emission of gaseous hydrocarbons, which should be minimised.

It will be appreciated that the above-described embodiment of the invention has been set forth by way of example and illustration thereof and that various modifications and alterations may be made therein without thereby departing from the spirit and scope of the invention.

What is claimed is:

1. A fuel tank for a motor vehicle, comprising
means for passing air into and venting the tank,
at least on filler pipe having an outlet end within the tank,
at least one recirculation conduit disposed within the tank and in communication with the filler pipe in such a way that hydrocarbon-bearing vapors and gases from the volume of the tank are circulateable through the filler pipe when filling the tank,
wherein the recirculation conduit is connected to the filler pipe within the volume enclosed by the tank, and wherein said recirculation conduit is connected to said filler pipe in the region of the outlet end of the filler pipe.

2. A tank as set forth in claim 1 and further including
a fuel vapor filter, and
a vent conduit connected upstream of the fuel vapor filter,
wherein the recirculation conduit has a first end communicating with the filler pipe and a second end remote from the first end and communicating with the vent conduit.

3. A tank as set forth in claim 1 and further including
a bead removal container, and
means connecting the recirculation conduit to the bead removal container.

4. A tank as set forth in claim 3
wherein the recirculation conduit is in the form of a discharge conduit of the bead removal container.

5. A tank as set forth in claim 3
wherein the recirculation conduit is connected between the filler pipe and the bead removal container in such a way that when the tank is being filled active emptying of the bead removal container is effected against a drop in level between the filling level of the tank and the bead removal container.

6. A tank as set forth in claim 3
wherein the recirculation conduit is connected between the filler pipe and the bead removal container in such a way that when the tank is being filled active emptying of the bead removal container is effected with a slight difference in level between the filling level of the tank and the bead removal container.

7. A tank as set forth in claim 3
wherein the recirculation conduit is arranged completely within the tank.

8. A tank as set forth in claim 3
wherein the bead removal container is arranged within the tank.

9. A tank as set forth in claim 3 and further including
means for pressurising the recirculation conduit for diagnostic purposes, said means including a pump for checking sealing integrity and having a pump pressure side,
wherein the bead removal container is connected to the pressure side of said pump.

10. A tank as set forth in claim 3
wherein the bead removal container includes at least one outlet which opens into said tank,
and further including a check valve operable to close the outlet of the bead removal container.

11. A tank as set forth in claim 1 and further including
means for pressurising the recirculation conduit for diagnostic purposes.

12. A tank as set forth in claim 1 and further including
a shut-off valve in the vent means.

* * * * *